(12) United States Patent
Eichhorn et al.

(10) Patent No.: US 7,972,392 B2
(45) Date of Patent: Jul. 5, 2011

(54) FUEL PREPARATION

(75) Inventors: Christian Eichhorn, Freiberg (DE);
Anton Althapp, Oberschöna (DE);
Dietmar Rüger, Bannewitz-Goppeln (DE); Olaf Schulze, Tuttendorf (DE)

(73) Assignee: Choren Industries GmbH, Freiberg (DE)

( * ) Notice: Subject to any disclaimer, the term of this patent is extended or adjusted under 35 U.S.C. 154(b) by 614 days.

(21) Appl. No.: 12/095,978

(22) PCT Filed: Nov. 3, 2006

(86) PCT No.: PCT/EP2006/010548
§ 371 (c)(1),
(2), (4) Date: Jun. 3, 2008

(87) PCT Pub. No.: WO2007/065512
PCT Pub. Date: Jun. 14, 2007

(65) Prior Publication Data
US 2008/0295396 A1    Dec. 4, 2008

(30) Foreign Application Priority Data

Dec. 8, 2005 (DE) .......................... 10 2005 058 534

(51) Int. Cl.
*C10L 1/19* (2006.01)
(52) U.S. Cl. ................ 44/300; 44/307; 44/308; 44/388; 44/401; 44/402; 585/733; 560/1; 560/129

(58) Field of Classification Search ............ 44/307–308, 44/388, 401–402; 585/700–752; 560/1, 560/129
See application file for complete search history.

(56) References Cited

U.S. PATENT DOCUMENTS

| 6,475,375 | B1 | 11/2002 | Dancuart |
| 2003/0126790 | A1 | 7/2003 | McCoy |
| 2004/0231237 | A1* | 11/2004 | Boer et al. ................. 44/446 |

FOREIGN PATENT DOCUMENTS

| DE | 31 49 170 A1 | 7/1982 |
| GB | 2 090 611 A | 7/1982 |
| GB | 2 384 004 A | 7/2003 |
| WO | WO 98/05740 A1 | 2/1998 |
| WO | WO 99/21943 A1 | 5/1999 |
| WO | WO 03/004588 A2 | 1/2003 |
| WO | WO 2005/087903 A1 | 9/2005 |

* cited by examiner

*Primary Examiner* — Robert J Hill, Jr.
*Assistant Examiner* — Brian McCaig
(74) *Attorney, Agent, or Firm* — Foley & Lardner LLP

(57) ABSTRACT

The invention relates to a fuel preparation for use in diesel engines consisting of plant oil mono-alcohol esters and up to 20 weight percent linear and branched paraffins and olefins of chain length C5-C11 and alcohols of chain length C2-C8, whereby the paraffins, olefins and alcohols are obtained by means of gasification of biomass and subsequent Fischer-Tropsch synthesis not involving any processing of the Fischer-Tropsch fraction by means of hydrogenating procedures and the preparation has a flash point >55° C. and a density >820 kg/m$^3$.

10 Claims, No Drawings

FUEL PREPARATION

The present invention relates to a fuel preparation that consists of at least one plant oil mono-alcohol ester and an admixture of up to 20 weight percent of a hydrocarbon fraction of Fischer-Tropsch synthesis having a maximal final boiling point of 196° C. that have not been treated with hydrogenating procedures and therefore contain, aside from n-paraffins, olefins of a chain-length of C5-C11 as well as a fraction of up to 10 weight percent of this fraction of alcohols of a chain length of C2-C8.

Conventional diesel fuel still consists mostly of hydrocarbon mixtures that are obtained from mineral oils. Considering the fact that the need for diesel fuel is increasing throughout the world and that the crude oil reserves and the refinery capacities continue to decrease, an attempt is being made to fill that developing supply gap, at least in part, with renewable raw material.

Attempts to directly use animal and plant oils as fuel can always only be seen as isolated solutions, since their direct utilization in combustion engines is excluded by the current state of the art. Only after extensive re-fitting of the vehicle technology does their utilization meet the requirements of modern environmental protection.

Although mixtures of different plant and animal oils and mineral hydrocarbons, such as are described in patent GB 2384004, circumvent the need for extensive re-fitting of the fuel system, the high final boiling point of the oils used causes them to fail to meet, amongst other things, the ever-decreasing limit values for particle emissions of vehicles equipped with diesel engines.

Another option of fuel preparation is to largely replace the mineral oil hydrocarbon fraction of diesel fuel with a mixture of plant oil mono-alcohol esters and short-chain alcohols. The main disadvantage of this fuel that is described in patent DE 3 149 170 is the complicated mixing technology that is required for its production. Moreover, the fuel tends to show segregation of the individual components even after only a short time of storage.

A clear improvement is attained by fully converting the freely available rape, soy, and palm oil by transesterification with short-chain mono-alcohols, such as methanol, ethanol or propanol, into the corresponding alkyl fatty acid esters. This fuel, which is quite common in the market and usually is called bio-diesel, can be used in most diesel engines without any major technical changes. This fuel has, aside from its excellent lubricity, a very low sulfur content (EN ISO 20846) and therefore attains much reduced particulate emissions.

Nevertheless, bio-diesel also is subjected to some restrictions with regard to quality in terms of the values required for category IV diesel in the World Fuel Charter 2002. These restrictions include, for example, the low cetane number, the high viscosity, and the poor properties in the cold, which reduce the usability in winter.

An improvement in the usability under everyday conditions is to be attained by blending bio-diesel with a hydrocarbon mixture obtained from Fischer-Tropsch synthesis, as described in WO 03/004588. As described in WO 03/004588 by way of an exemplary embodiment, mixtures of bio-diesel and of the diesel fraction of Fischer-Tropsch synthesis are used for this purpose at volume ratios of 1:4 to 4:1. According to the further description, the Fischer-Tropsch diesel was exposed to hydrogenating conditions in the process. As a result of this treatment, the Fischer-Tropsch fraction consists of 98 volume percent paraffinic hydrocarbons of a chain length of C8-C24 and a residual fraction of 2 volume percent olefins having the same chain length distribution. The light hydrocarbon fraction with a final boiling point <200° C. that is also obtained in Fischer-Tropsch synthesis generally is not being utilized in fuel production.

The invention is based on the technical problem to attain a largely environment-neutral, safe, easily to produce fuel mixture that is stabile during storage and meets the requirements of the World Fuel Charter IV for a diesel fuel that is suitable for everyday use.

This object for a diesel fuel of the type mentioned in the introduction is met by admixing up to maximally 20 weight percent of the light hydrocarbon fraction of Fischer-Tropsch synthesis having a final boiling point <200° C. to bio-diesel.

The invention shall be illustrated by the following examples and experiments. The fuel according to the invention for this purpose is obtained by simple mixing. Both components are miscible to an unlimited degree. Aside from the EN 590-compliant diesel fuel, commercial rape methyl ester (RME) and various hydrocarbon boiling fractions from Fischer-Tropsch synthesis were used in the production. Since the sulfur values of RME and of products of Fischer-Tropsch synthesis are close to the detection limit, a diesel fuel with a sulfur content that was as low as possible was used in order to obtain comparable results in the exhaust measurement.

The light boiling fraction from Fischer-Tropsch synthesis according to the invention contains 73.1 volume percent n-alkanes, 5.3 volume percent iso-alkanes, 12.5 volume percent olefins as well as 9.0 volume percent alcohols with the starting boiling point being 110° C. and the final boiling point being 190° C. The heavy Fischer-Tropsch diesel fraction used for comparison contains 87.2 volume percent n-alkanes, 11.7 volume percent iso-alkanes, and 1.1 volume percent olefins with the starting boiling point being 198° C. and the final boiling point being 305° C. In the engine tests using a VW beetle 1.9 Tdi/74 kW, commercial diesel and rape methyl ester (RME) are being compared with the test mixtures according to the invention made from rape methyl ester (RME) containing 15 weight percent of light Fischer-Tropsch fraction (called RME-15LF hereinafter), and rape methyl ester (RME) containing 15 weight percent Fischer-Tropsch diesel (called RME-15DF hereinafter), and rape methyl ester (RME) containing 30 weight percent Fischer-Tropsch diesel (called RME-30DF hereinafter).

The following table shows the physical properties of the fuel according to the invention compared to the mixtures, RME-15DF and RME-30DF produced according to WO/03004588, and the commercial fuels, diesel and RME. The data in Table 1 show that the three fuel mixtures, RME-15LF, RME-15DF, and RME-30DF, having a flash point >55° C., meet the requirements for safe handling and storage. Because of the only minor variation of the density and viscosity values that were determined, volumetric differences in fuel consumption are unlikely to occur.

As expected, the cetane number of the fuels increases with the fraction of n-alkanes that is admixed. The cetane number is a measure of the ignitability of a diesel fuel. If this value is relatively low, the lesser ignitability effects a longer delay of ignition resulting in poor cold start properties, high pressure peaks, and therefore higher exhaust emissions and noise emissions.

TABLE 1

Physical properties

| Property | Units | Method | Diesel | RME | RME-15LF | RME-15DF | RME-30DF |
|---|---|---|---|---|---|---|---|
| Cetane number | — | EN ISO 5165 | 55 | 51 | 60 | 63 | 63 |
| Density @ 15° C. | g/cm³ | EN ISO 3675 | 0.827 | 0.868 | 0.836 | 0.840 | 0.829 |
| Viscosity @ 40° C. | mm²/s | EN ISO 3104 | 3.023 | 4.411 | 3.129 | 3.295 | 2.980 |
| Flash point | ° C. | EN ISO 2719 | 57 | 144 | 57 | 58 | 67 |
| CFPP | ° C. | EN 116 | −15 | −14 | −19 | −15 | −15 |
| Sulfur | ppm | EN 20846 | 41 | 4 | <3 | <3 | <3 |

Surprisingly, it has become evident, though, that a fuel mixture produced according to the invention having a cetane value of 60 shows a markedly improved start-up behavior in the cold as compared to the commercial fuels, diesel and RME, as well as the reference mixtures, RME-15DF and RME-30DF. As is evident from the data in Tables 2 and 3, the surface tension of the fuel according to the invention, RME-15LF, is reduced almost to the level of diesel fuel. This low surface tension leads to a significantly improved spray pattern when the 5-hole nozzle having a nozzle diameter of 0.12 mm is used in the engine for exemplary purposes.

This shift of the droplet size distribution towards smaller droplets, the cold smoke that is present in the exhaust at start-up of the diesel engine is reduced noticeably. The injection nozzle is not observed to show late dripping. Moreover, the endoscopic findings obtained in the combustion chamber, the injectors, and in the injection nozzle after 15,000 km of test operation reveal no deposits for the use of RME-15LF. There is no need to admix light-off aids, such as diethyl ether, which is common for the operation of diesel engines in winter.

TABLE 2

Measurement of the surface tension at different temperatures

| Plate method mN/m | Diesel | RME | RME-15LF | RME-15DF | RME-30DF |
|---|---|---|---|---|---|
| 30° C. | 27.0 | 30.6 | 27.3 | 29.3 | 28.9 |
| 60° C. | 24.8 | 28.3 | 25.2 | 27.2 | 27.0 |

TABLE 3

Measurement of the droplet size distribution

| | Diesel | RME | RME-15LF | RME-15DF | RME-30DF |
|---|---|---|---|---|---|
| Maximum frequency vol. %/μm | 18 | 14 | 19 | 18 | 18 |
| Droplet diameter, μm | 125 | 245 | 105 | 155 | 185 |

Injection pressure 250 bar, fuel temperature 30° C.

Moreover, this clearly improved combustion behavior of the fuel used according to the invention leads to a detectable reduction of the combustion noise. As is shown in Table 4, the total level of airborne noise determined according to DIN 45635 of 86 dBA is the lowest of all tested fuels. The "nailing sound" that occurs when the engine exhibits major ignition delays is not present. An interference with the start-up behavior and the smoothness of running of the warm engine is also not observed because of the low boiling point of some of the components of the fuel according to the invention.

TABLE 4

Measurement of the combustion noise

| Combustion noise | Diesel | RME | RME-15LF | RME-15DF | RME-30DF |
|---|---|---|---|---|---|
| dBA | 87 | 93 | 86 | 88 | 88 |

Engine speed 2,000 rpm, fuel temperature 30° C.

The required emission limits of the Euro3 standard that apply to the test vehicle are also met. Surprisingly, the tests that were performed showed a clear effect in terms of a reduction of particle emissions. As is shown in Table 5, the soot value of 1.4 determined for the fuel, RME-15LF, is clearly below that of the other fuels. Since all RME-based fuels can be considered to be free of sulfur, the value of 2.4 for diesel should carry particular weight.

TABLE 5

Measurement of the soot value

| Soot value | Diesel | RME | RME-15LF | RME-15DF | RME-30DF |
|---|---|---|---|---|---|
| | 2.4 | 1.9 | 1.4 | 2.0 | 1.9 |

Engine speed 2,000 rpm, effective medium pressure 4 bar, fuel temperature 30° C.

In contrast to the tested fuels, the fuel preparation according to the invention shows a clear drop to lower temperatures in the determination of the CFPP value also. The alcohol fraction inhibits or prevents the growth of wax crystals as well as the agglomeration thereof. This effect is usually attained only by targeted addition of polymer-based additives.

In summary, the application of the composition according to the invention is associated with the following advantages: keeping the oxo-components in the Fischer-Tropsch product, the fuel system is observed to show a significantly lower tendency to become contaminated than comparable fuel mixtures made from plant oil mono-alcohol esters and having a Fischer-Tropsch fraction whose oxo-components were removed by means of a hydrogenating procedure. The markedly reduced surface tension of the fuel mixture, which is due to the oxo-components being kept in the Fischer-Tropsch product, effects improved vaporization of the injected fuel into the combustion chamber. The fuel composition does not include aromatic components. Despite its extremely low sulfur content, no lubricity-improving additives are needed. If released inadvertently, no more than a minor toxic effect on the exposed ecosystem is observed, compared to conventional petrochemical diesel fuels and the overall efficiency of fuel production is increased by dispensing with a hydrogenating treatment of the Fischer-Tropsch fraction.

Accordingly, the fuel RME-15LF produced according to the invention exhibits marked advantages with regard to safety, engine load, and environmental compatibility, under otherwise equal conditions when used in diesel engines.

Against this background, this unveils the opportunity to establish the light fraction of Fischer-Tropsch synthesis, which has thus far not been used effectively in engines, in a broad variety of applications in the diesel fuel market.

The invention claimed is:

1. Fuel preparation for use in diesel engines consisting of:
   plant oil mono-alcohol esters,
   linear and branched paraffins,
   olefins of chain length C5-C11, and
   alcohols of chain length C2-C8,
   wherein the linear and branched paraffins, olefins, and alcohols have a weight percent of up to 20%,
   wherein the paraffins, olefins and alcohols are obtained by means of gasification of biomass and subsequent Fischer-Tropsch synthesis not involving any processing of the Fischer-Tropsch fraction by means of hydrogenating procedures and the preparation has a flash point >55° C. and a density >820 kg/m$^3$.

2. Fuel composition according to claim 1, wherein the fraction of higher alcohols amongst the Fischer-Tropsch hydrocarbons is less than 10 volume percent.

3. Fuel composition according to claim 2, wherein the viscosity is less than or equal to 4 mm$^2$/s.

4. Fuel composition according to claim 3, wherein the cetane number is larger than 52.

5. Fuel composition according to claim 2, wherein the cetane number is larger than 52.

6. Fuel composition according to claim 1, wherein the viscosity is less than or equal to 4 mm$^2$/s.

7. Fuel composition according to claim 6, wherein the cetane number is larger than 52.

8. Fuel composition according to claim 1, wherein the cetane number is larger than 52.

9. Method for the production of a fuel preparation for use in diesel vehicles, consisting of:
   mixing plant oil mono-alcohol esters with branched and linear paraffins, olefins of chain length C5-C11, and alcohols of chain length C2-C8, wherein the linear and branched paraffins, olefins, and alcohols have a weight percent of up to 20%, whereby the mixture has a flash point >55° C. and a density >820 kg/m$^3$.

10. Method according to claim 9, wherein a product obtained by means of gasification of biomass and subsequent Fischer-Tropsch synthesis not involving subsequent hydrogenation is used as said branched and linear paraffins, olefins of chain length C5-C11, and alcohols of chain length C2-C8.

* * * * *